No. 646,202. Patented Mar. 27, 1900.
H. J. ASHLEY.
SPRING DRAFT DEVICE FOR VEHICLES.
(Application filed Aug. 8, 1898.)
(No Model.)
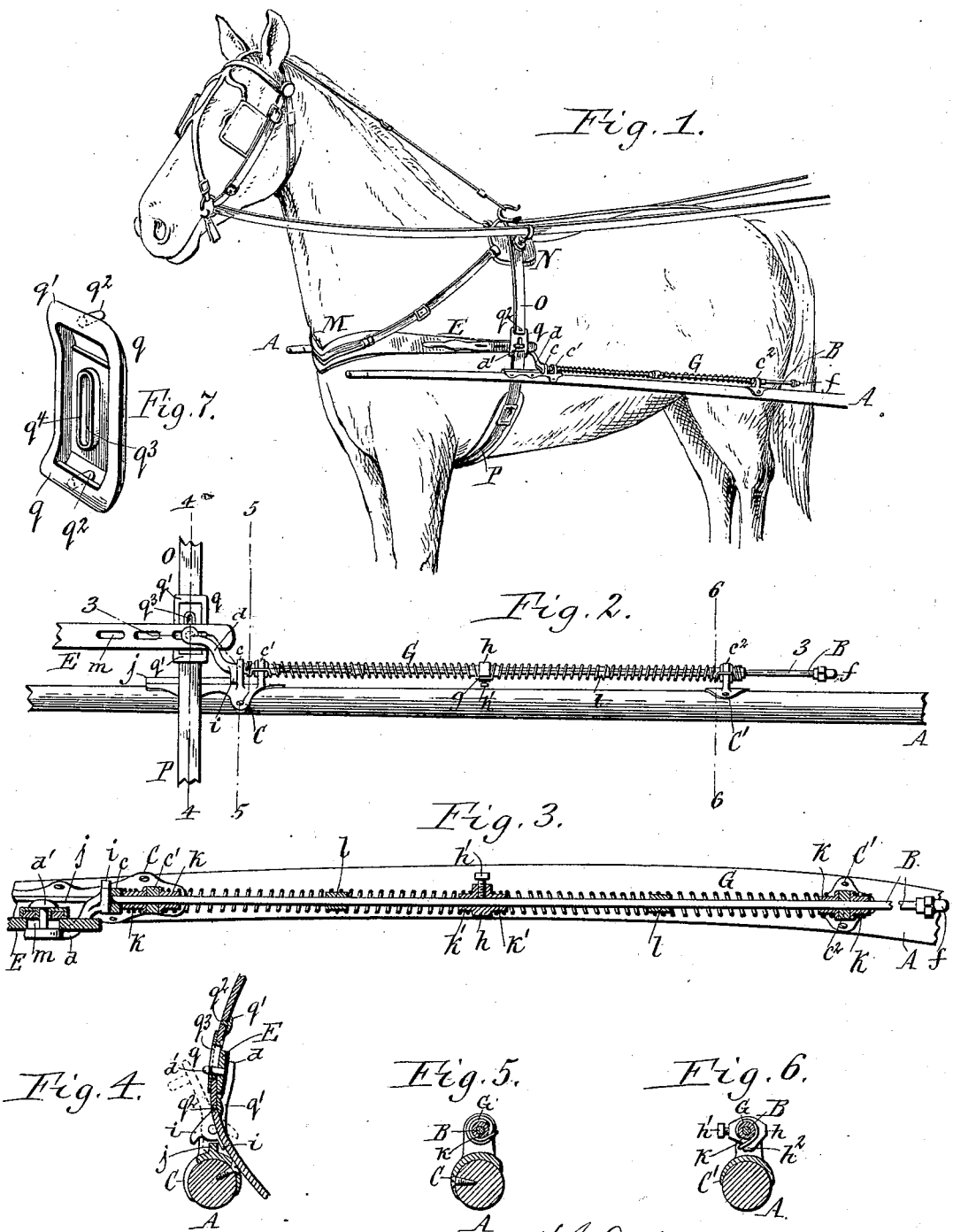

UNITED STATES PATENT OFFICE.

HARMON J. ASHLEY, OF MACHIAS, NEW YORK.

SPRING-DRAFT DEVICE FOR VEHICLES.

SPECIFICATION forming part of Letters Patent No. 646,202, dated March 27, 1900.

Application filed August 8, 1898. Serial No. 688,030. (No model.)

*To all whom it may concern:*

Be it known that I, HARMON J. ASHLEY, a citizen of the United States, residing at Machias, in the county of Cattaraugus and State of New York, have invented new and useful Improvements in Spring-Draft Devices for Vehicles, of which the following is a specification.

This invention relates to that class of draft attachments for vehicles which comprise, essentially, a sliding draft-rod guided on the thill and adapted to be attached at its front end to a short tug of the harness and a spring applied to the draft-rod and resisting the forward movement of the rod, so as to relieve the occupants of the vehicle from the jerks otherwise caused by the sudden starting or backing of the horse or in passing over a rough or undulating road.

The objects of my invention are to increase the resilience and the durability of the draft-spring, to so apply the spring that the same has a tendency to move the arm or attachment at the front end of the draft-rod away from the horse when the draft device is disconnected from the harness, so that the horse can freely enter and leave the thills, to prevent rattling of the draft-rod and its spring, and to provide a shield or attachment whereby the draft device can be attached directly and safely to the bearer to hold up the thill and enable the horse to hold back by the back-pad and girth alone.

In the accompanying drawings, Figure 1 is a perspective view of my improved draft device in connection with a horse and a pair of thills. Fig. 2 is an enlarged side elevation of one of the draft attachments viewed from the inner side of the thill. Fig. 3 is a horizontal section in line 3 3, Fig. 2, on an enlarged scale. Figs. 4, 5, and 6 are cross-sections in lines 4 4, 5 5, and 6 6, Fig. 2, respectively. Fig. 7 is a perspective view of one of the shields.

Like letters of reference refer to like parts in the several figures.

A represents the thills, each of which is provided with one of my improved draft devices. These devices are identical in construction, and a description of one will therefore apply to both.

B is the sliding draft-rod of the attachment, which is arranged lengthwise of the thill, preferably on the upper side thereof, as shown, and which is guided in upright perforated lugs or bearings $c\ c'\ c^2$, projecting upwardly from base-plates C C', secured to the thills by screws or other fastenings. The front lugs $c\ c'$ are both arranged on the base-plate C and form a strong double bearing for the rod at this point. The draft-rod is provided at its front end with an upwardly and forwardly extending arm $d$, terminating in a button or attachment $d'$, arranged on the outer side of the arm. In its normal position the draft-rod extends rearwardly beyond its rear lug or bearing and is provided at its rear end with a nut or stop $f$ for limiting its forward movement.

G is the spring applied to the draft-rod and serving to transmit the draft from said rod to the vehicle. This spring is preferably a torsional spring, and one-half of the body thereof is wound in one direction and the other half in the reverse direction. The end portions of the spring are bent around the bearing-lugs of the draft-rod, and its ends are wound around the rod in the reverse direction from the adjacent body portions of the spring, whereby the ends of the spring are prevented from turning on the rod and separate fastenings for this purpose are dispensed with. The central portion $g$ of the spring which connects its reversely-wound sections engages with a collar $h$, secured to the draft-rod and capable of rotary adjustment thereon by means of a set-screw $h'$, so that upon loosening this set-screw the collar can be turned on the rod for twisting and straining the spring, the collar being again tightened after tensioning the spring. The central portion of the spring is compelled to turn with this collar by a hook or shoulder $h^2$, which is formed on the collar and against which the connecting-bar $g$ of the spring abuts, as shown in Figs. 2 and 6. The spring is so wound and tensioned that it tends to turn the draft-rod in the proper direction to swing its attaching-arm $d$ outwardly or away from the horse, as indicated by dotted lines in Fig. 4, thereby keeping said arm out of the way while the horse enters and leaves the thills and also counteracting the tendency to draw the front ends of the thills toward each other by the draft. The twisting of the spring also holds the draft-rod against its bearings, preventing the rod from rattling.

In order to limit the inward and outward movements of the draft-arm $d$, this arm is provided below the draft-rod and on opposite sides thereof with lugs or stops $i$, adapted to bear against opposite sides of a longitudinal rib or rail $j$, formed on the upper side of the front base-plate C, according to the direction in which the arm is swung. The rib or rail $j$ is made of the proper length to form an abutment for the arm-stops $i$ in all positions of the draft-rod, and the stops are sufficiently separated to afford the necessary play of the arm $d$.

As the draft-spring is secured at its ends to the bearings of the draft-rod and at an intermediate point to the rod by means of the collar $h$, the forward movement of the rod, produced by the pull of the horse, causes the front portion of the spring to be compressed between this collar and the front bearing $c'$ of the rod and its rear portion to be extended by the forward movement of the collar. This construction produces not only an easy working spring of high resilience, but enables the life or durability of the spring to be practically doubled by reversing the spring on the draft-rod when the same becomes weak, whereby the portion thereof which was originally compressed is extended and the portion which was originally extended is compressed. To permit of such reversal of the spring, its ends are detachably secured to the draft-rod by simply twisting them around the rod.

By turning the adjusting-collar $h$ on the draft-rod the torsional resistance of the spring can be increased, more or less, and by adjusting the collar lengthwise of the draft-rod the longitudinal resistance or stiffness of the spring can be regulated as desired.

$k$ represents bushings or sleeves which surround the draft-rod adjacent to the bearing-lugs $c$ $c'$ $c^2$ and extend into the draft-spring and which serve to keep the spring out of contact with the rod. The collar $h$ is provided with similar sleeves $k'$.

$l$ represents sleeves or bushings, preferably of rubber, applied to the draft-rod about midway between the collar $h$ and the bearings $c'$ $c^2$ of the draft-rod. These sleeves, as well as the sleeves $k$ $k'$, separate the spring from the draft-rod, and thereby prevent the same from rattling and also relieve the spring from wear.

M is the breast-collar, having extensions or short tugs E, provided with openings or longitudinal slots $m$, which engage with the buttons $d'$ of the draft-rods. These buttons are preferably oblong and arranged with their greatest dimension in line with the slots of the breast-collar.

N is the saddle, and O represents skirts or bearers extending downwardly from opposite sides of the saddle and connected at their lower ends with the belly-band or girth P. The lower portion of each bearer passes through a metallic shield $q$, which is detachably connected with the arm $d$ of the draft-rod, said shield having depressed transverse loops $q'$, through which the bearer passes. The cross-bar of each of said loops is provided with a fixed outwardly-projecting stud $q^2$, which passes through a hole in the bearer. The shield is provided centrally with an upright or longitudinal slot $q^3$, and the bearer is formed with a coinciding slot, and these slots receive the button $d'$ of the draft-rod, it being necessary to give the shield a quarter turn or twist to interlock the same with said button and to detach it therefrom. The slot of this shield is preferably provided with a raised marginal rim or flange $q^4$, which extends into the corresponding slot of the bearer, so as to form a metallic lining or reinforcement for the same, as shown in Figs. 3 and 7. As shown in Figs. 2 and 3, the short tug E is confined between the arm $d$ of the draft-rod and the shield $q$.

By passing the bearers through the shields $q$ and connecting these shields with the draft-rods, as shown, the vehicle can be backed by the horse without the use of a breeching, the thrust of the horse being transmitted from the saddle to the thills by the bearers, the shields, and the draft-rods, and the shields forming a firm connection between the draft-rods and the harness, which renders it possible to hold back with the saddle-pads and bearers without a breeching. The shoulders at the junction of the draft-rods and their arms abut against the front lugs $c$ in backing. As an ordinary thill-tug cannot be used with this device, because it and the bearer would interfere with the free movement of the end of the rod toward and from the horse, and also as this device is preferably attached to the top of the thill, the holdback-strap cannot be attached to the thill in the ordinary way. Consequently it becomes necessary to provide the plate or shield $q'$ so that this device can be attached directly and safely to the bearer to hold up the thill and to enable the horse to hold back by the back-pad and girth alone.

The horse is readily detached from the vehicle by simply unbuttoning the tugs E and the shields $q$ from the draft-rods.

I claim as my invention—

1. In a draft attachment for vehicles, the combination with a thill having bearings or guide-lugs, of a longitudinal draft-rod capable of sliding and turning in said bearings and provided with a laterally-extending arm adapted to be attached to a harness, and a spring acting upon said draft-rod and arranged to turn the same outwardly in its bearings, for moving said arm away from the animal when the arm is detached from the harness, substantially as set forth.

2. In a draft attachment for vehicles, the combination with the thill having bearings or guide-lugs, of a rotary draft-rod journaled lengthwise in said bearings and capable of sliding and turning therein and provided at its front end with a laterally-extending arm adapted to be attached to a harness, and a torsional spring surrounding said rod and having one end thereof interlocked with one of said bearings and having its free portion engaged with said draft-rod, whereby the spring when strained tends to turn said rod in its bearings, substantially as set forth.

3. The combination with a draft-rod adapted to slide lengthwise on the thill, of a spiral spring surrounding said rod and having its ends confined against longitudinal movement with reference to the rod and having its central portion engaged with said rod so as to move lengthwise therewith, whereby the front portion of the spring is compressed and its rear portion extended when the rod is drawn forwardly, substantially as set forth.

4. The combination with a thill having bearings or guide-lugs, of a draft-rod capable of sliding lengthwise in said bearings, and a spiral spring detachably applied to said draft-rod and capable of being reversed thereon, end for end, and having its ends confined against longitudinal movement with reference to the rod and having its central portion engaged with the rod, so as to move lengthwise therewith, substantially as set forth.

5. The combination with a rotary draft-rod adapted to slide lengthwise on the thill and provided with an arm for connecting the same with the harness, of a spiral spring surrounding said rod and having its ends confined against rotary movement, and having its central portion engaged with the rod so as to turn therewith, the portions of the spring on opposite sides of its point of engagement with the draft-rod being wound in opposite directions, substantially as set forth.

6. The combination with a rotary draft-rod adapted to slide lengthwise on the thill and provided at its front end with an arm for connecting the same with the harness and between its bearings or guides with a collar capable of rotary adjustment on the rod, of a spiral spring surrounding said rod and having its ends confined against rotary movement with reference to the rod and having its central portion engaged with said adjustable collar so as to turn therewith, substantially as set forth.

7. The combination with a thill, of a rotary draft-rod arranged to slide in bearings on the thill and provided with an arm for connecting the same with the harness, of a spring acting on said rod and tending to turn the same in the proper direction to move its arm outwardly or away from the horse, and stops which limit the rotary movement of said rod, substantially as set forth.

8. The combination with a thill having guides or bearings and a longitudinal stop-rail, of a rotary draft-rod sliding in said bearings and having an arm for connecting the rod with the harness and stops adapted to engage against opposite sides of said stop-rail, and a spring applied to the draft-rod and tending to turn the same in the proper direction to move its arm away from the horse, substantially as set forth.

9. The combination with the thills, a bearer and a draft-rod guided on the thills and having an arm which is provided with a button, of a spring applied to said rod and a metallic shield having end loops through which the bearer passes, studs projecting from the cross-bars of said loops and engaging with holes in the bearer and a slot coinciding with a corresponding slot of the bearer and having a raised marginal rim which extends into the slot of the bearer and forms a lining therefor, the slot of said shield being adapted to engage with the button on the arms of the draft-rod, substantially as set forth.

Witness my hand this 29th day of July, 1898.

HARMON J. ASHLEY.

Witnesses:
CARL F. GEYER,
KATHRYN ELMORE.